US008905713B2

(12) United States Patent
Bunker et al.

(10) Patent No.: US 8,905,713 B2
(45) Date of Patent: Dec. 9, 2014

(54) ARTICLES WHICH INCLUDE CHEVRON FILM COOLING HOLES, AND RELATED PROCESSES

(75) Inventors: Ronald Scott Bunker, Niskayuna, NY (US); Benjamin Paul Lacy, Greer, SC (US)

(73) Assignee: General Electric Company, Niskayuna, NY (US)

(*) Notice: Subject to any disclaimer, the term of this patent is extended or adjusted under 35 U.S.C. 154(b) by 827 days.

(21) Appl. No.: 12/790,675

(22) Filed: May 28, 2010

(65) Prior Publication Data
US 2011/0293423 A1 Dec. 1, 2011

(51) Int. Cl.
*F01D 5/18* (2006.01)

(52) U.S. Cl.
CPC ............ *F01D 5/186* (2013.01); *F05D 2230/10* (2013.01); *Y02T 50/676* (2013.01); *Y02T 50/672* (2013.01); *Y02T 50/67* (2013.01)
USPC ....................................... 416/97 R

(58) Field of Classification Search
None
See application file for complete search history.

(56) References Cited

U.S. PATENT DOCUMENTS

| | | |
|---|---|---|
| 4,197,443 A | 4/1980 | Sidenstick |
| 4,529,358 A | 7/1985 | Papell |
| 4,650,949 A | 3/1987 | Field |
| 4,653,983 A | 3/1987 | Vehr |
| 4,664,597 A | 5/1987 | Auxier et al. |
| 4,672,727 A | 6/1987 | Field |
| 4,738,588 A | 4/1988 | Field |
| 4,762,464 A | 8/1988 | Vertz et al. |
| 4,808,785 A | 2/1989 | Vertz et al. |
| 5,062,768 A | 11/1991 | Marriage |
| 5,096,379 A | 3/1992 | Stroud et al. |
| 5,609,779 A | 3/1997 | Crow et al. |
| 5,979,663 A | 11/1999 | Herrmann et al. |
| 6,234,755 B1 | 5/2001 | Bunker et al. |
| 6,307,175 B1 | 10/2001 | Blochlinger et al. |

(Continued)

FOREIGN PATENT DOCUMENTS

| | | |
|---|---|---|
| EP | 1 326 007 A2 | 7/2003 |
| EP | 1510283 A1 | 3/2005 |
| GB | 2384734 A | 8/2003 |
| JP | 2008248733 A | 10/2008 |

OTHER PUBLICATIONS

R. S. Bunker et al., "System and Method for Improved Film Cooling," Pending US. Appl. No. 12/435,547, filed May 5, 2009.

(Continued)

*Primary Examiner* — Richard Edgar
(74) *Attorney, Agent, or Firm* — Francis T. Coppa

(57) ABSTRACT

An article is described, including an inner surface which can be exposed to a first fluid; an inlet; and an outer surface spaced from the inner surface, which can be exposed to a hotter second fluid. The article further includes at least one row or other pattern of passage holes. Each passage hole includes an inlet bore extending through the substrate from the inlet at the inner surface to a passage hole-exit proximate to the outer surface, with the inlet bore terminating in a chevron outlet adjacent the hole-exit. The chevron outlet includes a pair of wing troughs having a common surface region between them. The common surface region includes a valley which is adjacent the hole-exit; and a plateau adjacent the valley. The article can be an airfoil. Related methods for preparing the passage holes are also described.

22 Claims, 10 Drawing Sheets

(56) References Cited

U.S. PATENT DOCUMENTS

| | | | |
|---|---|---|---|
| 6,329,015 B1 | 12/2001 | Fehrenbach et al. | |
| 6,383,602 B1 * | 5/2002 | Fric et al. | 416/97 A |
| 6,573,474 B1 | 6/2003 | Loringer | |
| 6,706,996 B2 | 3/2004 | Wybrow et al. | |
| 6,905,396 B1 | 6/2005 | Miller et al. | |
| 6,908,657 B2 * | 6/2005 | Farmer et al. | 416/97 R |
| 6,969,817 B2 | 11/2005 | Lee et al. | |
| 6,984,102 B2 | 1/2006 | Bunker et al. | |
| 7,186,084 B2 | 3/2007 | Bunker et al. | |
| 7,328,580 B2 | 2/2008 | Lee et al. | |
| 7,373,778 B2 | 5/2008 | Bunkier et al. | |
| 7,997,867 B1 * | 8/2011 | Shih et al. | 416/97 R |
| 8,057,179 B1 * | 11/2011 | Liang | 416/97 R |
| 8,319,146 B2 | 11/2012 | Bunker et al. | |
| 8,376,706 B2 | 2/2013 | Bunker et al. | |
| 8,387,245 B2 | 3/2013 | Bunker et al. | |
| 8,528,208 B2 | 9/2013 | Rebak et al. | |
| 8,533,949 B2 | 9/2013 | Bunker | |
| 2003/0091432 A1 | 5/2003 | Byrd et al. | |
| 2005/0135931 A1 * | 6/2005 | Nakamata et al. | 416/97 R |
| 2005/0286998 A1 * | 12/2005 | Lee et al. | 415/117 |
| 2008/0003096 A1 * | 1/2008 | Kohli et al. | 415/115 |
| 2008/0286090 A1 * | 11/2008 | Okita | 415/115 |

OTHER PUBLICATIONS

S. Hada, "Development of High Performance Film Cooling of 1700 Degree C Class Gas Turbines," 2008 Japanese Gas Turbine Conference, pp. 264-272, Aug. 3, 2007.

Non-certified translation of section of reference "Development of High Performance Film Cooling of 1700 Degree C Class Gas Turbines," Citation 2, 2008 Japanese Gas Turbine Conference, Aug. 3, 2007.

Unofficial English Translation of CN Office Action issued Jun. 3, 2014 in connection with corresponding CN Patent Application No. 201110084913.2.

* cited by examiner

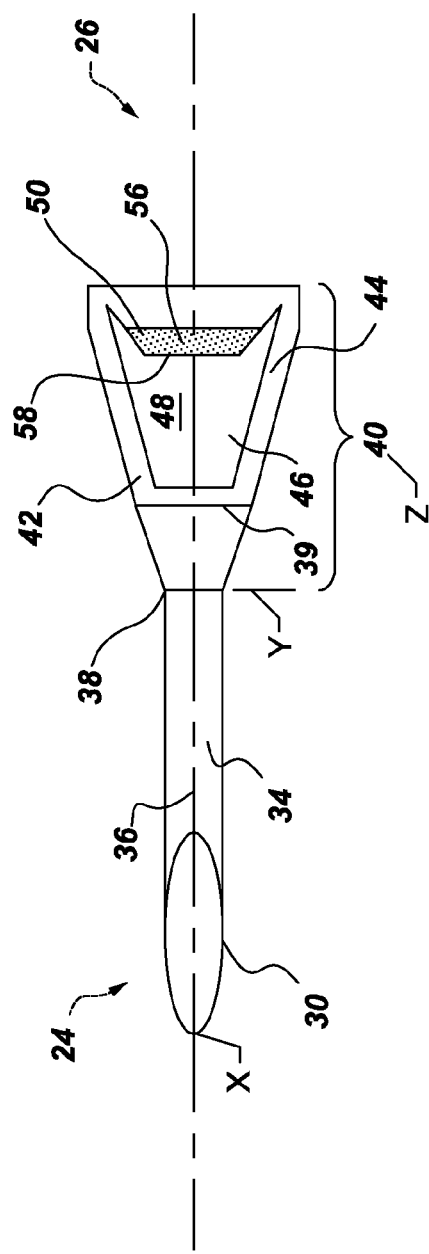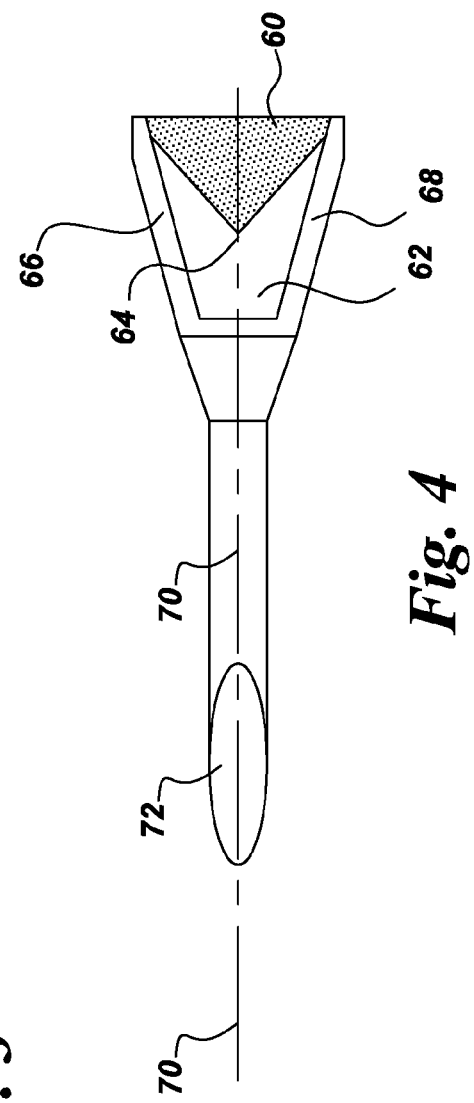

ARTICLES WHICH INCLUDE CHEVRON FILM COOLING HOLES, AND RELATED PROCESSES

STATEMENT REGARDING FEDERALLY SPONSORED RESEARCH & DEVELOPMENT

This invention was made with Government support under contract number DE-FC26-05NT42643, awarded by the Department of Energy. The Government has certain rights in the invention.

BACKGROUND

The general subject matter of this invention relates to gas turbine engines, and, more specifically, to structures for cooling various components of the engines.

A gas turbine engine includes a compressor, in which engine air is pressurized. The engine also includes a combustor, in which the pressurized air is mixed with fuel, to generate hot combustion gases. In a typical design (e.g., for aircraft engines or stationary power systems), energy is extracted from the gases in a high pressure turbine (HPT) which powers the compressor, and in a low pressure turbine (LPT). The low pressure turbine powers a fan in a turbofan aircraft engine application, or powers an external shaft for marine and industrial applications.

The need for cooling systems in gas turbine engines is critical, since the engines usually operate in extremely hot environments. For example, the engine components are often exposed to hot gases having temperatures up to about 3800° F. (2093° C.), for aircraft applications, and up to about 2700° F. (1482° C.), for the stationary power generation applications. To cool the components exposed to the hot gases, these "hot gas path" components typically have both internal convection and external film cooling.

In the case of film cooling, a number of cooling holes may extend from a relatively cool surface of the component to a "hot" surface of the component. The cooling holes are usually cylindrical bores which are inclined at a shallow angle, through the metal walls of the component. Film cooling is an important mechanism for temperature control, since it decreases incident heat flux from hot gases to the surfaces of components. A number of techniques may be used to form the cooling holes; depending on various factors, e.g., the necessary depth and shape of the hole. Laser drilling, water jet cutting, and electro-discharge machining (EDM) are techniques frequently used for forming film cooling holes. The film cooling holes are typically arranged in rows of closely-spaced holes, which collectively provide a large-area cooling blanket over the external surface.

The coolant air is typically compressed air that is bled off the compressor, which is then bypassed around the engine's combustion zone, and fed through the cooling holes to the hot surface. The coolant forms a protective "film" between the hot component surface and the hot gas flow, thereby helping protect the component from heating. Furthermore, protective coatings, such as for example, thermal barrier coatings (TBCs), may be employed on the hot surface to increase the operating temperature of the components.

Film cooling is highest when the coolant flow "hugs" the hot surface. With this in mind, many different surface geometries and shapes have been designed for the exit region of the cooling holes. Examples include different types of trenches and craters, which are purposefully formed on one or more of the component surfaces. These surface features can enable a longer duration of contact between the coolant flow and the hot surface, and/or can provide a cooler, effective gas temperature layer on the surface.

Various considerations are important in designing the most appropriate film cooling system. For example, a certain volume of air is usually required to flow over the hot surface of the component, and as described above, it is also important that a significant portion of that air stay attached to the hot surface, for as long as possible. Moreover, since a large number of film cooling holes require a larger amount of air to be bled off the engine compressor, engine efficiency may suffer if too many cooling holes are present. Furthermore, since future turbine engine designs may involve even higher operating temperatures, improved film cooling systems may take on even greater importance.

With these considerations in mind, new methods and structures for improving film cooling capabilities in gas turbine engines would be welcome in the art. The innovations should enhance the performance of the cooling stream, without significantly decreasing engine efficiency. The film cooling structures should also not interfere with the strength and integrity of the turbine engine part. Moreover, the new film cooling structures should be capable of being formed, accurately and efficiently, by one or more of the drilling, cutting, and machining techniques mentioned above.

BRIEF DESCRIPTION OF THE INVENTION

In one embodiment of the invention, an article in the form of a substrate is disclosed, comprising an inner surface which can be exposed to a first fluid; and including an inlet; and an outer surface spaced from the inner surface, which can be exposed to a hotter second fluid. The article further includes at least one row or other pattern of passage holes, wherein each passage hole includes an inlet bore extending through the substrate from the inlet at the inner surface to a passage hole-exit proximate to the outer surface, with the inlet bore terminating in a chevron outlet adjacent the hole-exit. The chevron outlet comprises a pair of wing troughs having a common surface region between them; wherein the common surface region comprises a valley which is adjacent the hole-exit; and further comprises a plateau adjacent the valley.

Another embodiment is directed to a film-cooled airfoil or airfoil region configured with one or more chevron film cooling holes. The airfoil or airfoil region comprises:

a) at least one inner surface exposed to a first fluid; and including an inlet;

b) an outer surface spaced from the said inner surface, and exposed to a hotter second fluid; and c) at least one row or other pattern of passage holes, wherein each passage hole includes an inlet bore extending partially through the substrate from the inner surface to a passage hole-exit proximate to the outer surface, with the inlet bore terminating in a chevron outlet, as described herein.

Still another embodiment is directed to a method for the formation of a row or other pattern of passage holes in a substrate which includes an inner surface and an outer surface spaced from the inner surface, and further comprises an inlet bore extending at least partially between the two surfaces, said inlet bore terminating in a chevron outlet adjacent a hole-exit proximate to the outer surface, wherein the chevron outlet comprises a pair of wing troughs having a common surface region between them, said common surface region comprising a valley adjacent the hole-exit, and a plateau adjacent the valley. The method comprises forming each inlet bore and chevron outlet by directing a contacting device or a contacting medium to a pre-selected region of the substrate, in a computer-controlled single- or repeated plunging motion, sweeping motion, or combined plunging-and-sweeping motion.

BRIEF DESCRIPTION OF THE DRAWINGS

FIG. 3 is a plan view of the passage hole illustrated in FIG. 2, taken along line 3-3.

FIG. 4 is a transverse sectional view of a passage hole according to another embodiment of this invention.

DETAILED DESCRIPTION OF THE INVENTION

Figure 1:
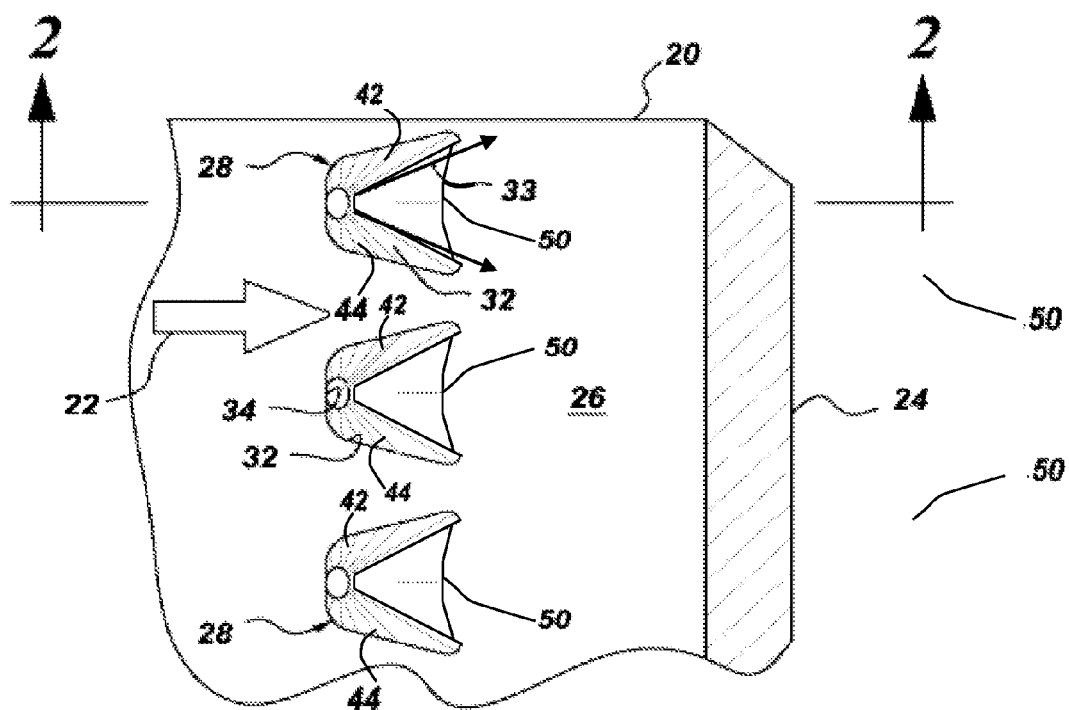
FIG. 1 is a perspective view of an outer surface of a substrate, illustrating the general exit region of three passage holes which extend through the substrate.

The numerical ranges disclosed herein are inclusive and combinable (e.g., ranges of "up to about 25 wt %", or, more specifically, "about 5 wt % to about 20 wt %", are inclusive of the endpoints and all intermediate values of the ranges). In terms of any compositional ranges, weight levels are provided on the basis of the weight of the entire composition, unless otherwise specified; and ratios are also provided on a weight basis. Moreover, the term "combination" is inclusive of blends, mixtures, alloys, reaction products, and the like.

Furthermore, the terms "first," "second," and the like, herein do not denote any order, quantity, or importance, but rather are used to distinguish one element from another. The terms "a" and "an" herein do not denote a limitation of quantity, but rather denote the presence of at least one of the referenced items. The modifier "about" used in connection with a quantity is inclusive of the stated value, and has the meaning dictated by context, (e.g., includes the degree of error associated with measurement of the particular quantity).

Moreover, in this specification, the suffix "(s)" is usually intended to include both the singular and the plural of the term that it modifies, thereby including one or more of that term (e.g., "the passage hole" may include one or more passage holes, unless otherwise specified). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described inventive features may be combined in any suitable manner in the various embodiments.

Any substrate which is exposed to high temperatures and requires cooling can be used for this invention. Examples include ceramics or metal-based materials. Non-limiting examples of the metals or metal alloys which might form the substrate include steel, aluminum, titanium; refractory metals such as molybdenum; and superalloys, such as those based on nickel, cobalt, or iron. The substrate can also be formed of a composite material, such as a niobium silicide intermetallic composite.

Very often, the substrate is at least one wall of a gas turbine engine component. This type of wall, and the turbine components themselves, are described in many references. Non-limiting examples include U.S. Pat. No. 6,234,755 (Bunker et al) and U.S. Pat. No. 7,328,580 ((Lee et al; hereinafter "Lee"), both of which are incorporated herein by reference.

The Lee reference comprehensively describes an aviation gas turbine engine which is axisymmetrical about a longitudinal or axial centerline axis. The engine includes, in ordered flow communication, a fan, a multistage axial compressor, and an annular combustor, which is followed in turn by a high pressure turbine (HPT) and a low pressure turbine (LPT).

The HPT usually includes a turbine nozzle, having a row of hollow stator vanes supported in inner and outer nozzle bands. A first stage turbine follows the first stage turbine nozzle and includes a row of hollow rotor blades extending radially outwardly from a supporting rotor disk and surrounded by an annular turbine shroud. A low pressure turbine (LPT) follows the high pressure turbine and includes additional nozzles and rotor blades which may or may not include internal cooling circuits depending upon the engine design. An exhaust liner usually follows the low pressure turbine.

During the operation of a gas turbine engine like that described in the Lee patent, ambient air is pressurized by the fan mentioned above. A portion of the ambient air enters the compressor for additional pressurization, while the outer portion is discharged from a fan outlet for providing propulsion thrust in a turbofan engine application. The air pressurized in the compressor is mixed with fuel in the combustor for generating hot combustion gases. The combustion gases flow through the various turbine blade stages which extract energy therefrom for powering the compressor and fan during operation. Additional details regarding the architecture of such an engine can be found in the Lee patent, along with various other references.

While a typical gas turbine engine like that described above and in the Lee reference may have a conventional configuration and operation, such an engine is modified as described herein, to include improved film cooling. Thus, one or more of the various engine components which are subject to heating from the hot combustion gases of the engine may be suitably cooled by bleeding a portion of the pressurized air from the compressor during operation, as mentioned previously.

These components usually include at least one metal wall 20, as depicted in FIG. 1. The wall can be formed from a superalloy like those mentioned above, since those materials exhibit high strength at elevated temperatures. A portion of the wall is illustrated in plan view in FIG. 1; and a portion is also shown as a cross-section in FIG. 2. The thickness of the wall will vary, depending on the article in which it is incorporated. In many instances, e.g., for many aviation components, the wall has a thickness in the range of about 0.020 inch to about 0.150 inch (508 microns to about 3810 microns). For land-based components, the wall often has a thickness in the range of about 0.050 inch to about 0.300 inch (1270 microns to about 7620 microns).

The wall includes opposite inner and outer wall surfaces 24, 26. The inner or inboard surface of the wall forms the outer boundary of a suitable cooling circuit provided in the component which receives air bled from the compressor in any conventional manner. The outer surface 26 is exposed to the hot combustion gases 22 during operation (see FIG. 1), and requires suitable film cooling protection.

Figure 2:
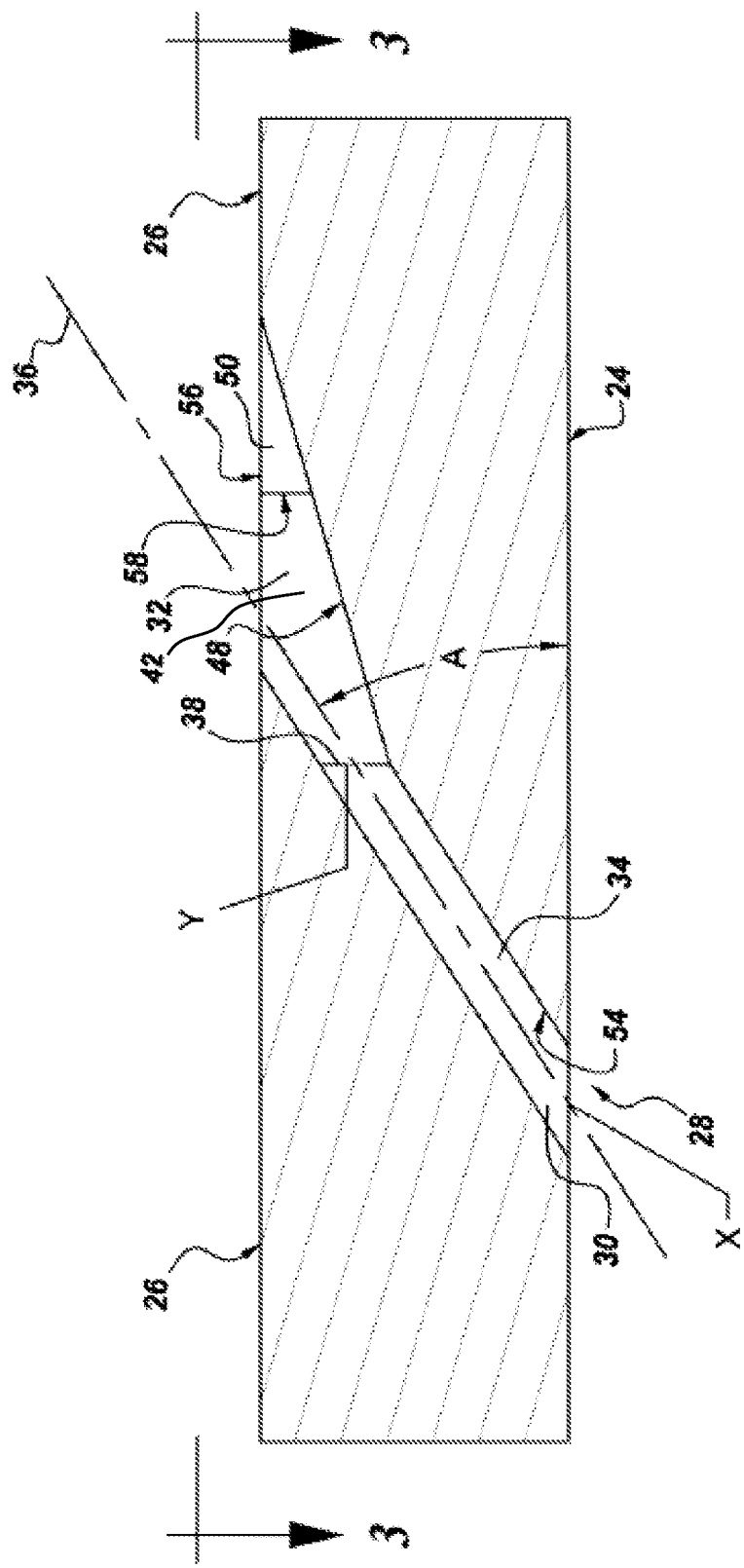
FIG. 2 is a transverse sectional view, taken along line 2-2 of FIG. 1, of one of the passage holes illustrated in FIG. 1.

The exemplary component wall 20 illustrated in FIGS. 1 and 2 may be found in various components. They include the inner or outer combustor liners, turbine nozzle vanes, turbine nozzle bands, turbine rotor blades, the turbine shroud, or the exhaust liner. All of these components frequently incorporate various forms of film cooling holes or "passage holes" therein.

For embodiments of the present invention, passage holes 28 are arranged in a suitable row or other pattern (FIG. 1), along a selected span of the wall component 20. As in embodiments of the Lee patent, passage holes 28 are identified by their "chevron" configuration. In preferred embodiments, each passage hole 28 extends longitudinally through the wall 20, and diverges both longitudinally along the hole, and laterally across the width of the hole. Thus, each hole extends from an inlet 30 disposed flush at the inner surface 24 (see FIG. 2) to a chevron outlet 32 disposed flush at the outer surface 26. As mentioned above, a portion of the pressurized air from the compressor is directed through the passage hole 28 (FIG. 1) as coolant air 33, exiting at the chevron outlet 32.

In preferred embodiments, each of the passage holes 28 includes an inlet bore 34. The bore usually has a substantially constant flow area from its inlet end to its outlet end. As depicted in FIG. 2, the inlet bore has a longitudinal or axial centerline axis 36. The bore itself can be thought of as the portion of the passage hole which remains cylindrical or substantially cylindrical, i.e., prior to the beginning of the chevron outlet. Thus, in FIG. 2, the inlet bore can be thought of as the section between points X and Y along axis 36. The upward termination site of the inlet bore can be referred to as "bore outlet" 38, which still lies below outer wall surface (exterior wall surface) 26. The inlet bore can be inclined at a relatively shallow angle "A", relative to its inner or outer surfaces, which are typically parallel with each other. The inclination angle A of the inlet bore is usually related to the typical inclination used for film cooling holes, e.g., about 20 degrees to about 45 degrees.

As mentioned previously, FIG. 3 is a plan view of the passage hole illustrated in FIG. 2, taken along line 3-3. The figure depicts passage hole inlet 30, effectively bisected by centerline axis 36. Inlet bore 34 is shown as extending from point X to point Y, i.e., ending as bore outlet 38. The remainder of the passage hole from bore outlet 38 toward surface 26 (i.e., in a direction opposite that of inlet hole 30) can be thought of as the "passage hole-exit"

With continued reference to FIG. 3, the bore outlet 38 terminates at a chevron outlet, generally designated as feature 40. For most of its length "Z", the chevron outlet 40 comprises a pair of wing troughs, 42 and 44. The wing troughs diverge longitudinally from a trough initiation site 39 (the "upstream" beginning of the troughs), to the exterior wall surface 26 (FIG. 2). The trough initiation site is usually located about 15% to about 35% of the length from bore outlet 38, based on the total length of chevron outlet 40 along axis 36 (FIG. 3).

In some embodiments, the wing troughs are similar in size and shape to the wing troughs in the Lee patent mentioned previously, and usually have a substantially elliptical cross-sectional shape. As an example, the wing troughs may be substantially circular or partially circular.

The wing troughs 42, 44 have a common surface region 46 between them. The wing troughs can be said to diverge laterally along this surface region, in a direction away from inner wall surface 24, to eventually blend with outer wall surface 26.

In some embodiments, the common surface region 46 comprises a valley or "floor" 48, and a plateau 50, adjacent the valley 48. Plateau 50 rises above the valley, and extends along axis 36, in a direction opposite hole inlet 30, terminating at a site 52, which is generally flush with outer wall surface 26. It should be understood that the valley 48, while below the level of plateau 50, is still generally higher than the depth of the wing troughs 42, 44. Moreover, valley 48 can be considered an extension of the lower surface 54 (FIG. 2) of inlet bore 34 (usually an arcuate surface). As described below, the passage hole and chevron outlet geometry described in embodiments of this invention can be obtained by using certain types of drilling, machining, and cutting techniques.

As generally depicted in FIG. 2, plateau 50 is typically an elevated, relatively level feature rising above valley 48. The top surface 56 of the plateau can be very flat, and somewhat parallel to the surface of valley 48. However, as further described below, the shape, size and orientation of the plateau can vary considerably, as can any of the individual surfaces or "faces" of the plateau. As one example, the front face 58 of the plateau (see FIG. 3) can be substantially perpendicular to the surface of valley 48. However, as shown below, the front surface is usually sloped, e.g., gradually decreasing in size (like a ramp) until merging into the valley surface 48. In general, the shape and size of the plateau and the valley from which it rises are important factors in maximizing the diffusion of cooling air that is channeled through the passage holes. As further described below, another advantageous result is a reduced flow separation of the cooling air from outer wall surface 26.

With reference to FIG. 3, the position of plateau 50 within the entire area of chevron outlet 40 may also be a significant feature for some embodiments. Each trough can be said to have a total length dimension extending from trough initiation site 39 to a terminus farthest downstream from the passage hole inlet 30, i.e., to the point at which the troughs meet outer surface 26 (i.e., site 52 in FIG. 3). In some embodiments, substantially all of the plateau is located in a region that is more than about 40% of the total length dimension away from site 39. In some other preferred embodiments, substantially all of the plateau is located in a region that is more than about 60% of the total length dimension away from site 39.

In some embodiments, the plateau, from a plan view ("top view") like that of FIG. 3, can have the shape of a triangle, a trapezoid, or any other polygon. FIG. 3 shows plateau 50 in the shape of a trapezoid. FIG. 4 is illustrative of a plateau having the shape of a triangle. (In this figure, features similar or identical to those of FIGS. 2 and 3 are not labeled). In FIG. 4, the plateau 60 rises above valley 62. The triangle of the plateau includes an upstream vertex 64, lying generally in a midpoint area between the two troughs 66, 68, in line with axis 70, and pointing toward passage hole inlet 72. However, the vertex need not be aligned with axis 70, e.g., it can be "off-center". Moreover, the triangle itself need not be equilateral. As mentioned previously, the precise shape for the plateau is determined in large part by the manner in which it is formed. (The two troughs can also vary somewhat from each other, e.g., in depth and shape).

Figure 5:
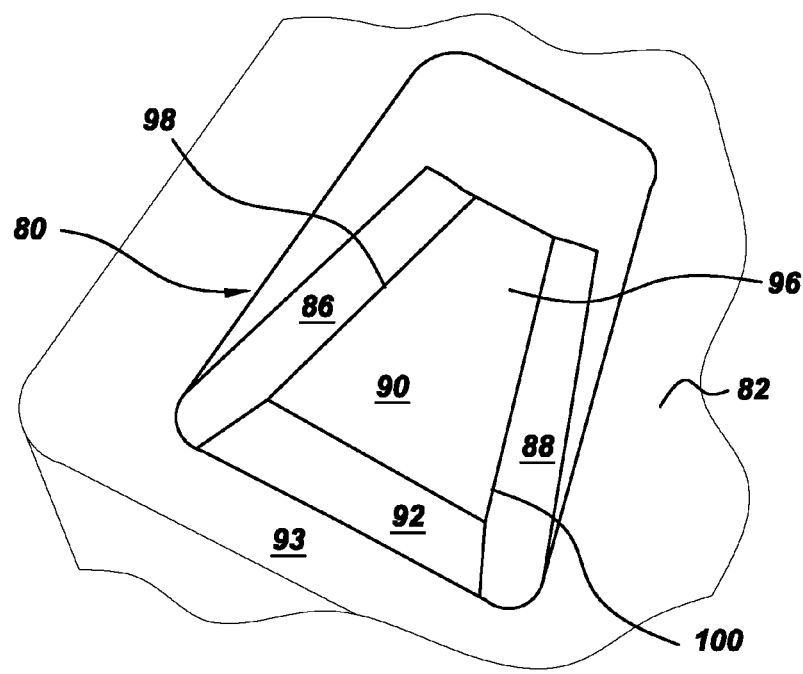
FIG. 5 is a top view of the chevron outlet region of a passage hole according to an embodiment of the invention.

FIG. 5 is an illustration of another embodiment of a portion of a passage hole 80, shown as a top view of the outer surface ("hot surface") 82 of a substrate. In this figure (somewhat similar to FIG. 7, discussed below), plateau 92 is situated between troughs 86 and 88. (The plateau can generally lie in the same plane as outer surface region 93, although the figure seems to show plateau 92 as being angled upwardly from region 93). A valley 90 slopes downwardly from the plateau, toward an inlet bore (not specifically shown) extending into the substrate. The plateau can vary in height, relative to surface 82. In some embodiments, the height of the plateau is about 2% to about 20% of the length-dimension extending from the passage hole-exit to a terminus farthest away from the hole-exit.

Figure 6:
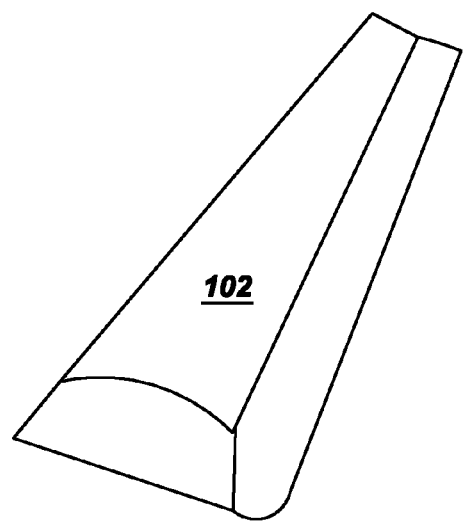
FIG. 6 is a top view of a portion of the chevron outlet region of a passage hole according to embodiments of the invention.

Moreover, in some embodiments, the features of surface 90, trough 86, and trough 88 can all merge into the inlet bore. Furthermore, in some instances, the edges 98 and 100, formed by the intersections of surfaces 86 and 90; and 88 and 90, respectively, need not be "sharp", straight line edges. For example, they could, independently of each other, be curved or "rounded". As depicted in FIG. 6, which is a sectional portion of a passage hole like that of FIG. 5, top surface/valley 102 could also be curved, along a general "arc" extending across from one trough to another trough (troughs not shown here), or along some other line of curvature.

Figure 7:
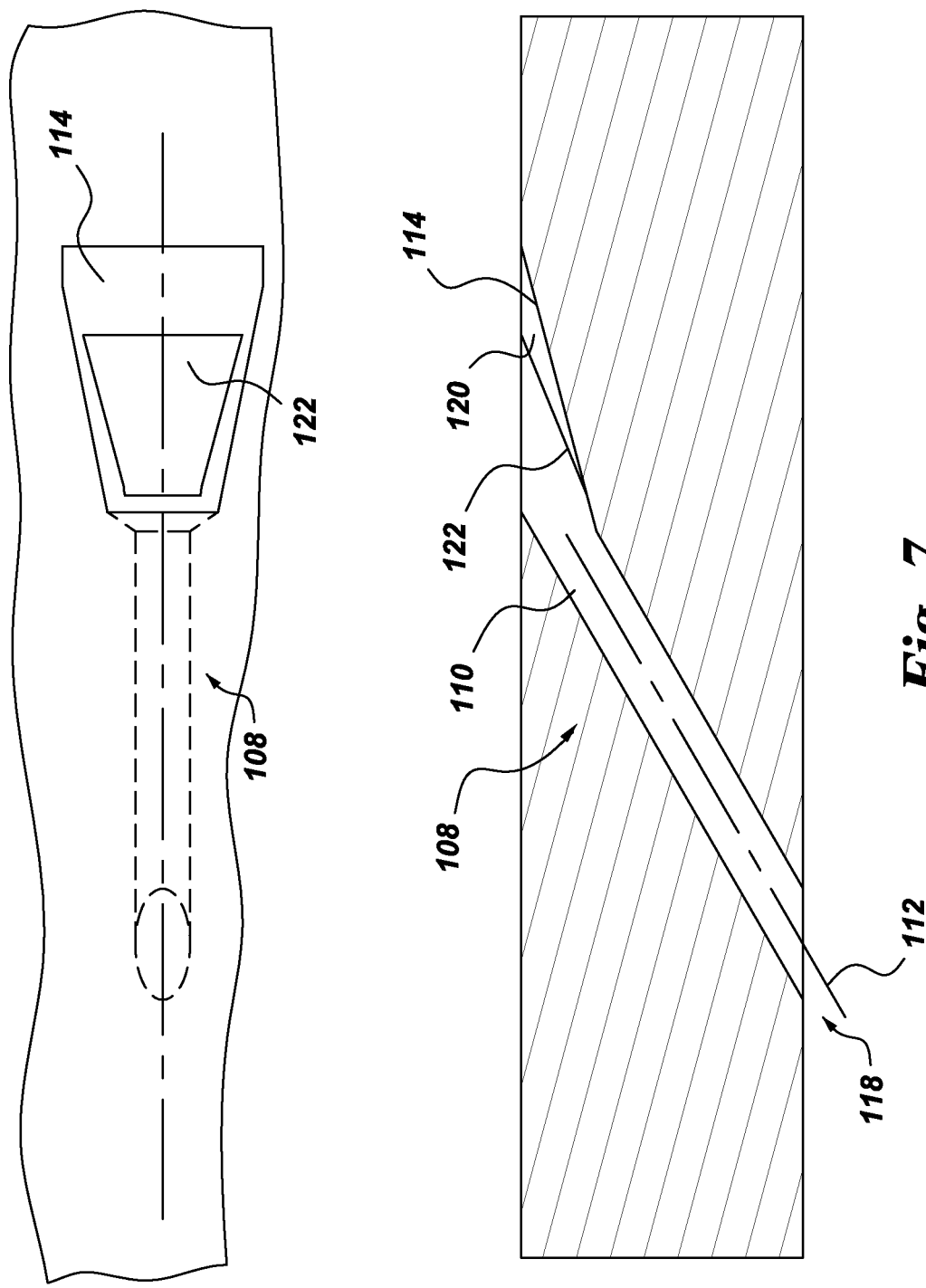
FIG. 7 is a transverse sectional view of a passage hole according to another embodiment of this invention.

FIG. 7 is a view of a passage hole 108, having another chevron shape, according to embodiments of this invention. (Features similar to those in FIGS. 2 and 3 may not be labeled here). A transverse sectional view is provided in the lower half of the figure, showing an inlet bore 110, situated along axis 112. The upper half of the figure is a plan view or "top view". In this embodiment, plateau 114 is a raised region, farthest from inlet hole 118. A valley 120 is adjacent the plateau, extending along axis 112. The valley has a top surface 122 which slopes down, in the direction of inlet hole 118.

As mentioned above, articles like those described herein are often covered by one or more coatings. Coatings which serve a number of purposes may be used. Frequently, coatings which provide thermal protection, and/or oxidation protection are applied. As one example, an article such as a gas turbine blade may be covered by a ceramic coating, e.g., a thermal barrier coating (TBC) formed of a zirconia material such as yttria-stabilized zirconia. In many cases for turbine blades, a bond layer is first applied over the blade surface, e.g., a metal-aluminide or MCrAlY material, where "M" can be iron, nickel, cobalt, or mixtures thereof. These coating systems are described in many references, such as the Bunker '755 patent mentioned previously.

Figure 8:
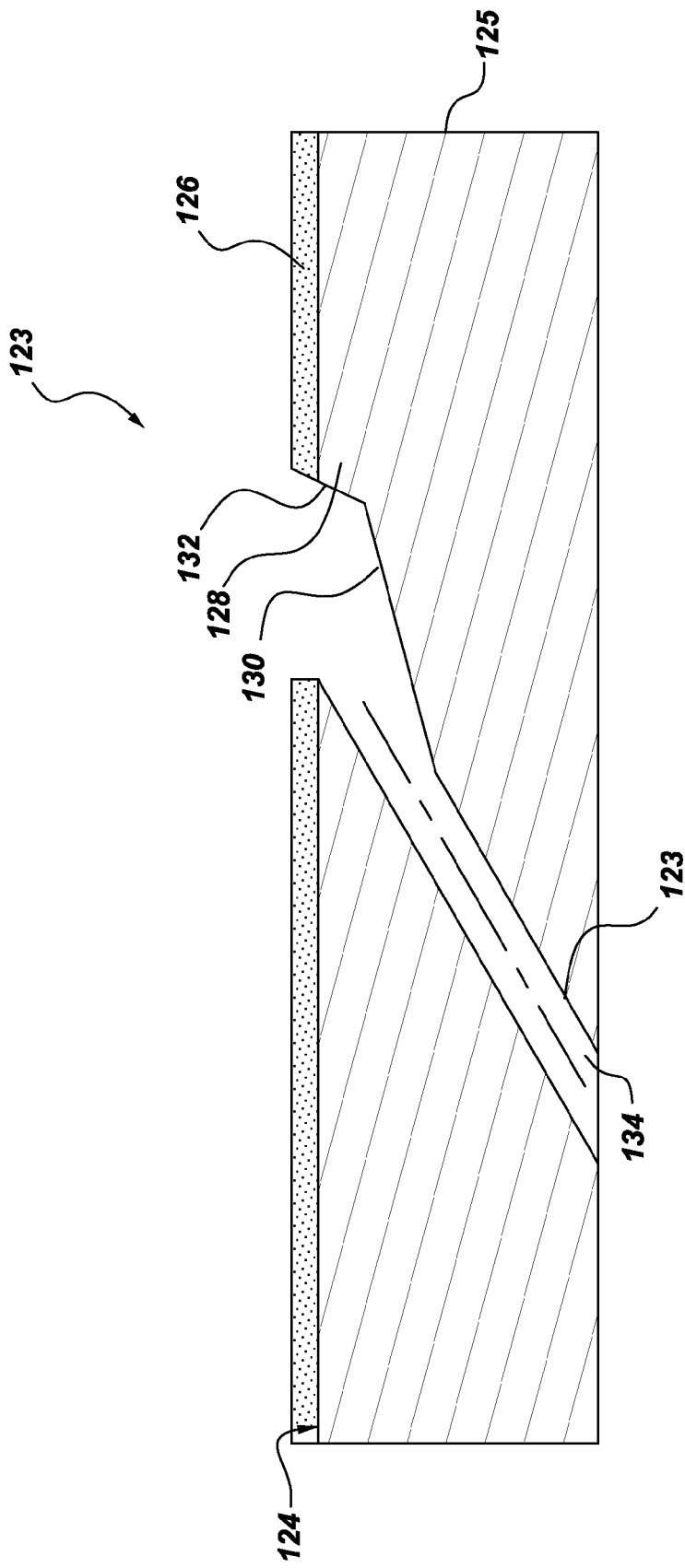
FIG. 8 is a transverse sectional view of a passage hole and exit site region, for a substrate covered by a coating, according to embodiments of the invention.

FIG. 8 is a transverse sectional view of another passage hole 123, extending through a substrate 125, according to some inventive embodiments. In this instance, the outer surface ("hot" surface) 124 of the substrate is covered by a protective coating system 126, which as described above, can constitute one or more individual coatings. The thickness of the protective coating can vary greatly (e.g., about 0.005 inch (127 microns) to about 0.050 inch (1270 microns), depending on various factors. In the case of a nickel superalloy-based turbine blade used in the "hot" section of a land-based gas turbine, protective coatings often have a thickness in the range of about 0.015 inch (381 microns) to about 0.045 inch (1143 microns), and most often, about 0.020 inch (500 microns) to about 0.035 inch (889 microns). The passage hole 123 is formed through the substrate 125 and through the coating 126 by one of the techniques described below.

With continuing reference to FIG. 8, plateau 128 extends from and rises above valley 130. In this instance, the "front face" 132 of the plateau is sloped in the direction of inlet bore 134. However, the shape and size of the plateau and the surrounding valley can vary considerably, depending on various factors. They include the desired exit geometry for the coolant fluid which will travel through the passage hole, and also the technique by which the hole and chevron area are formed within coating 126 and substrate 125. The ability to modify film cooling characteristics through protective coatings, according to new coolant flow geometries, is an important aspect for embodiments of this invention.

The passage holes of the present invention can be formed successfully by several specialized techniques, using selected types of equipment. The techniques can include water jet cutting systems, electric discharge machining (EDM) systems, and laser-drilling systems. Each of these systems is described below. Moreover, in some cases, each of these techniques can be carried out by using the specific instrument in a single or repeated plunging motion, as also described below. (In this description, the EDM is said to involve treatment of the substrate with a "contacting device"; while water jet cutting systems and laser-drilling systems are said to involve treatment of the substrate with a "contacting medium", as further described below).

As alluded to above, in some embodiments, the passage holes are formed by a water jet cutting process, e.g., an abrasive water jet cutting process. Such a process, sometimes referred to as a "water saw", is known in the art, and described in many references. Non-limiting examples include U.S. Pat. No. 6,905,396 (Miller et al); U.S. Pat. No. 5,979,663 (Herrmann et al); U.S. Pat. No. 5,851,139 (Xu); and U.S. Pat. No. 5,169,065 (Bloch), all incorporated herein by reference.

In general, the water jet process utilizes a high-velocity stream of abrasive particles (e.g., abrasive "grit"), suspended in a stream of high pressure water. The pressure of the water may vary considerably, but is often in the range of about 5,000-90,000 psi. A number of abrasive materials can be used, such as garnet, aluminum oxide, silicon carbide, and glass beads. The process can be used in various embodiments of this invention, e.g., for the formation of passage holes through a metal substrate, or through the substrate and a protective coating over the substrate, as described previously. Unlike some of the other cutting processes used on metals, the water jet process does not involve heating of the substrate to any significant degree. Therefore, there is no "heat-affected zone" formed on the substrate surface, which could otherwise adversely affect the desired exit geometry for the passage hole.

Moreover, the water jet system can include a multi-axis computer numerically controlled (CNC) unit. The CNC systems themselves are known in the art, and described, for example, in U.S. Patent Publication 2005/0013926 (S. Rutkowski et al), which is incorporated herein by reference. They CNC systems allow movement of the cutting tool along a number of X, Y, and Z axes, as well as rotational axes.

Figure 9:
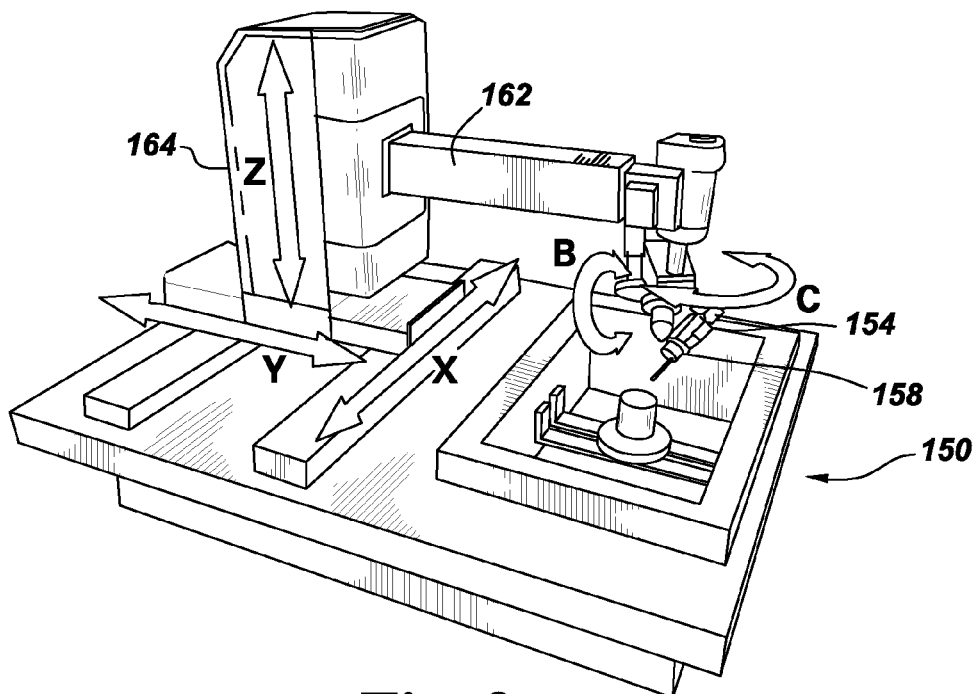
FIG. 9 is a schematic perspective of a water jet cutting machine utilized in embodiments of the invention.
Figure 10:
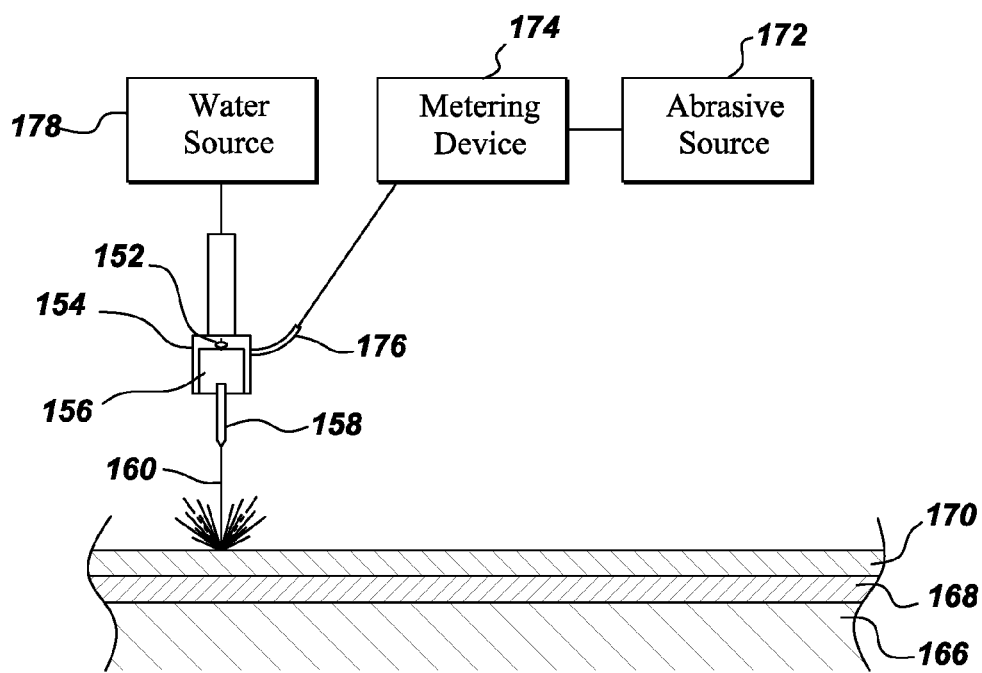
FIG. 10 is a schematic perspective view of a nozzle assembly for a water jet cutting machine related to the present invention.

FIG. 9 is a schematic perspective of one water jet cutting machine 150, suitable for the present invention. FIG. 10 is a schematic perspective view of the nozzle assembly of the machine of FIG. 9, depicting the function of the machine with respect to a substrate, described below. The water jet machine of FIG. 10 is usually equipped with a high capacity pump (not shown,) capable of delivering a liquid supply 178 (typically water), at a high rate of pressure to a jet orifice 152 (FIG. 10). The jet orifice is supported within a distribution head 154, which defines, internally, a mixing chamber 156. The pressurized liquid is delivered from the mixing chamber, into and through a delivery nozzle 158, to be emitted at a correspondingly high force, as mentioned above, in a linear jet stream 160 (see FIG. 10). (Various details regarding this type of equipment are also set forth in the above referenced patent to Miller et al).

With continuing reference to FIGS. 9 and 10, the distribution head 154 and the nozzle 158 can be supported on a cantilevered arm 162 from an upright movable stanchion 164. This arrangement allows for controlled reciprocatory movement of the distribution head 154 and the nozzle 158 about multiple axes of movement, e.g., horizontally in perpendicularly oriented directions of movement, as signified by axes X and Y, and vertically, as signified by axis Z (as mentioned above). In addition, appropriate motors (not shown) may also be provided on the cantilevered arm 162. These motors can provide associated rotary motion of the distribution head and nozzle e.g., about perpendicularly oriented rotational axes represented by axes B and C.

With reference to FIG. 10, a portion of a typical substrate 166 is depicted. In a non-limiting illustration, metallic coating 168 has been applied directly over the outer surface of the substrate, and a ceramic coating 170 (e.g., a TBC as discussed above) has been applied over the metallic coating. According to the mechanism depicted in the figure, a supply of a flowable abrasive material 172 is delivered through a metering device 174, via the tube 176. The abrasive material can be drawn by the venturi effect into the mixing chamber 156, for mixing with a primary pressurized stream of water 178, in the formation of the jetted fluid stream 160. (The abrasive materials can be of the type described above).

As described in the patent to Miller et al, the control of the movement of the jet stream 160 is critical to the effective performance of the water jet apparatus. By the controlled motion of the jet nozzle 158 (e.g., by the CNC device mentioned previously) selectively about the multiple axes B, C, X, Y, Z (FIG. 9), it is possible to reciprocate the jet nozzle in a three-dimensional path of movement. These motion paths conform precisely to the three-dimensional configuration and shape of substantially any substrate, coated or uncoated, while maintaining the nozzle 158 at a precisely consistent spacing and angular orientation with respect to the substrate. Moreover, those skilled in the art understand that many features and parameters can be selectively set, varied and controlled, to optimize the use of the water jet cutting tool. Non-limiting examples of adjustments include: the pressure of the abrasive water jet stream as emitted from the nozzle; the mixing ratio of the abrasive with respect to the water, the shape and relative diffusion of the fluid stream; the particular type of abrasive material, and its size; and the nozzle diameter.

In most of the preferred embodiments of the invention, the water jet technique is carried out by directing the linear jet stream to a pre-selected region of the substrate, according to one or more selected patterns. The delivery nozzle is programmed to direct the jet stream in a single or repeated plunging motion, sweeping motion, or combination of plunging motions and sweeping motions. The selected pattern is one which provides the passage hole geometry described previously, which includes formation of the inlet bore and formation of the chevron outlet.

Figure 11:
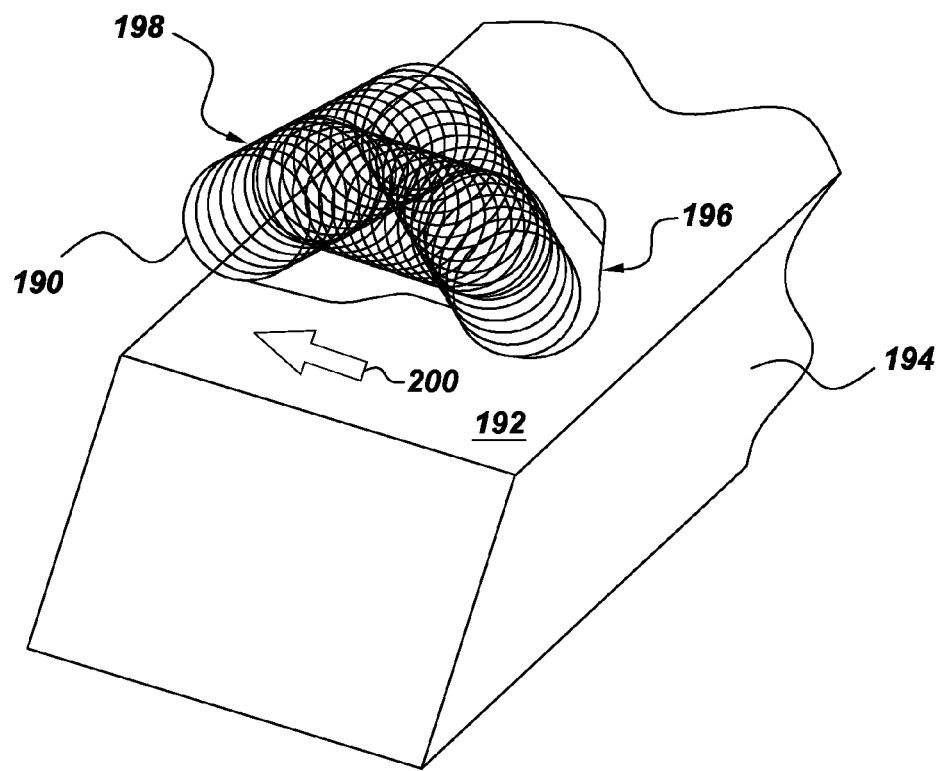
FIG. 11 is an illustration of the motion of a plunging device forming passage holes in a substrate, according to some of the inventive embodiments.

FIG. 11 is a simple illustration of the plunging motion for making the particular passage holes, according to some embodiments of the invention. The plunging motion is usually carried out by a cylindrical tool, which can be associated with various types of equipment, e.g., a water jet, a laser, an electro-discharge machining (EDM), or a mechanical bit. While the plunging technique will be described in detail here for a water jet apparatus, those skilled in the art will be able to adapt the technique to the other equipment described herein, without undue effort.

With continuing reference to FIG. 11, a water jet machine such as that described above can be used. A series of pre-programmed plunges ("multi-plunges") is used to form circular hole shapes 190 through the outer surface 192 of substrate 194. (The delivery nozzle and water-jet stream are not pictured here, but would be positioned above the substrate, as described previously. Moreover, while a large number of holes can be formed in the substrate by this technique, a single hole is illustrated here) As one non-limiting illustration, the direction of successive hole shapes can proceed across surface 192, from the pre-selected region for one trough 196 to a trough 198 (somewhat obstructed from this view) on an opposite side of the substrate. The controlled movement of the water-jet stream could also follow a generally horizontal path 200, after formation of the troughs. This movement could be considered a controlled "sweeping" across the surface of the substrate. Thus, formation of the hole shapes could be carried out with a combination of plunging and sweeping motions. A CNC-type device like that described previously is especially suited for the plunging (e.g., the "Z" direction in FIG. 9) and sweeping (e.g., the X and Y directions) motions used to form each passage hole.

Figure 12:
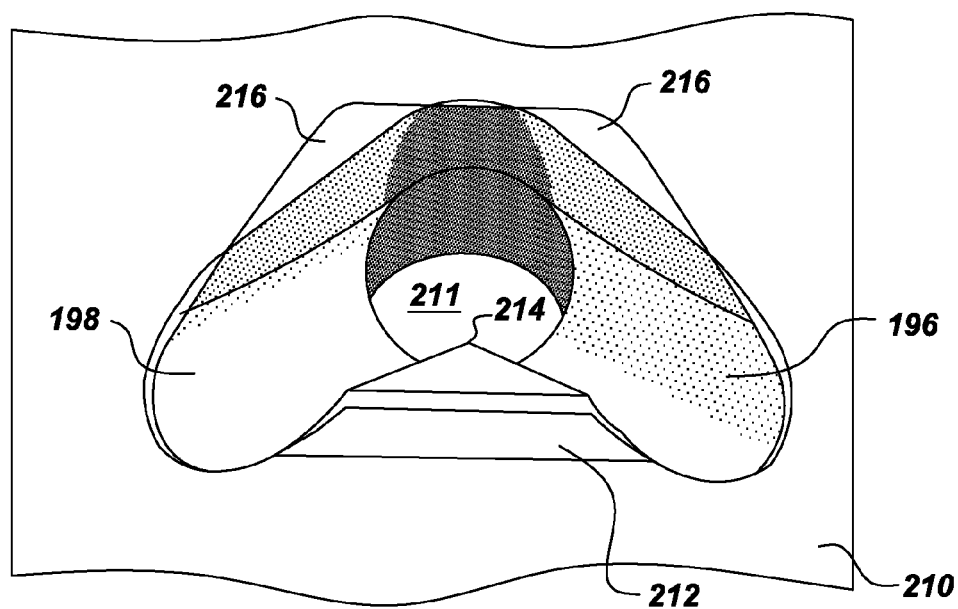
FIG. 12 is an illustrated top view of the chevron region of a passage hole formed by a multi-plunge technique, according to the invention.

FIG. 12 is a representation of a portion of a passage hole 210, formed by way of the multi-plunge technique. Troughs 196 and 198, and inlet bore 211, are depicted in the figure. Plateau 212 is also shown, having a triangular shape in which one vertex 214 "points" in the direction of inlet bore 211. The shaded features 216 depict differences in features, as compared to those of passage holes formed in a conventional chevron-outlet shape. In other words, features 216 (which could be thought of as a single feature as well) form a "hood" above the troughs, for some of the embodiments in which the multi-plunge technique is used. While such a hood might be present to some extent in the chevron shapes known in the art, e.g., those in the Lee et al patent discussed above, a hood of this size and shape does not appear to have been known previously. In some embodiments, the hood exhibits a greater curvature in the upper surface region of the film hole, as compared to the previously known chevron shapes. Moreover, in some preferred embodiments, the total surface area of the hood is at least about 20% of the total surface area of the troughs, e.g., as shown in FIG. 12. In the case of a high-temperature substrate, the modified geometry of this "hood zone" may promote greater attachment of a film coolant to the outer surface (the "hot surface") adjacent the exit hole, i.e., attachment for a longer distance along the surface.

In some embodiments, the passage holes of the present invention can also be formed successfully by using an electric discharge machining (EDM) technique. EDM techniques are known in the art, and described in a number of references, such as U.S. Pat. No. 6,969,817 (Martin Kin-Fei Lee et al); incorporated herein by reference. The techniques are sometimes referred to as "EDM milling"; "spark machining" or "spark eroding". In general, EDM can be used to obtain a desired shape in a substrate or workpiece, by way of a series of rapidly recurring current discharges. The discharges originate between two electrodes, separated by a dielectric liquid, and subject to an electric voltage.

As a more specific example for some types of EDM equipment, a DC voltage can be applied to a drill electrode, and the desired section of the substrate is eroded by a spark formation in a gap between the drill electrode and the substrate surface. A dielectric liquid is usually forced into the gap between the electrode and the workpiece. Typically, EDM drilling machines use water (e.g., non-conductive, deionized water) as the working fluid. The material removal process is partly spark erosion and partly electrochemical. In general, the workpiece conductivity requirements prevent the use of an EDM process for substrates which are covered by nonconductive materials, such as ceramic (TBC) overcoats. Other details regarding EDM equipment, and operation settings for using the equipment, will be known to those skilled in the electromachining arts.

For most embodiments of the present invention, the EDM electrode is directed to the substrate in a sweeping motion, as described previously. The motion can be directed along the pathways illustrated in FIG. 11, or a different pathway can be chosen. As in the case of the water jet cutting process, the EDM machinery can be controlled by a multi-axis computer numerically controlled (CNC) unit. These units can direct the electrode along full 2- and 3-dimensional pathways, along with permitting movement on one or more rotational axes.

Figure 13:
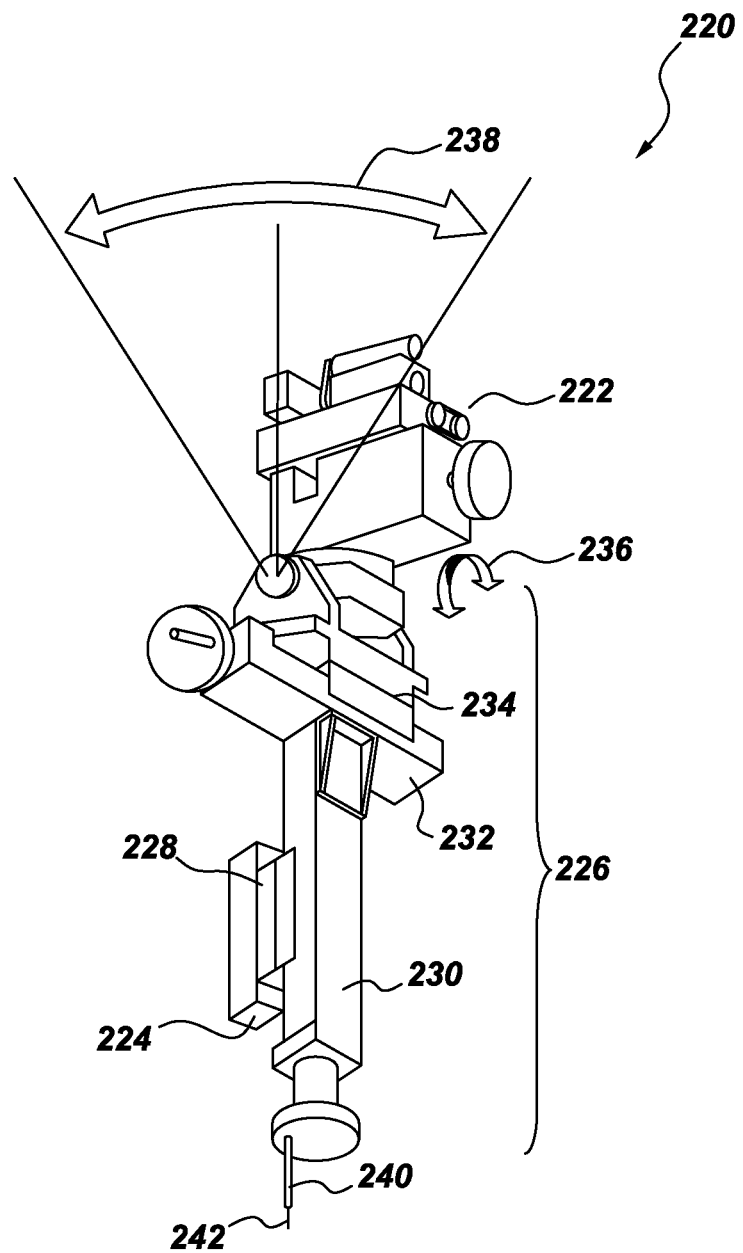
FIG. 13 is a schematic perspective of an electric discharge machining device useful for embodiments of the invention.

One, non-limiting example of an EDM apparatus suitable for the present invention is depicted in FIG. 13. Many elements of such an apparatus are also set forth in the Kin-Fei Lee patent referenced previously. Apparatus 220 includes a head assembly 222. The function and detail regarding the head assembly are known in the art (e.g., FIG. 3 of U.S. Pat. No. 9,969,817), and need not be discussed in detail here. An electromagnet 224 is coupled to a slide assembly 226, by way of an adaptor plate 228 A first manual slide 230 is coupled to the slide assembly adaptor plate. The manual slide 230 allows an operator to position the head assembly 222 after the apparatus has been attached to a substrate, e.g., an outer surface of a turbine blade, via the electromagnet 224, or by way of some other conventional attachment mechanism.

A second manual slide 232 is operatively coupled to the first manual slide 230, and may be configured to provide perpendicular translation of the head assembly 222 with respect to the first manual slide 230. The second slide 232 is operatively coupled to a mini tilt and swivel vice 234. The mini tilt and swivel vice 234 allows for rotation of the head assembly 222 in both directions illustrated by the curved arrow 236. Vice 234 also allows for a angular tilting of the head assembly 222. (This angular tilting is represented by the arrow 238). Although manual slides and mini tilt and swivel vices are discussed in this embodiment, it should be understood that any mechanism that allows for the positioning of the head assembly 222 relative to a surface or area to be drilled and/or milled (e.g., any CNC device) would be equivalents that may be used in various embodiments of the disclosed apparatus.

In a typical EDM apparatus which can be used for the present invention, a holder 240 is employed to fasten and guide the movement of a consumable, wire electrode 242. Various types of holders and electrodes for EDM systems are available commercially. One source is Aerospace Techniques, Middletown, Conn. The wire electrode, fed through apparatus 220, can be directed by the programming associated with the apparatus to precisely form the passage hole/exit geometry required for this invention.

In other embodiments, the passage holes of the present invention can be formed successfully by using a laser system, e.g., a laser drilling apparatus. In preferred embodiments, the laser source employs at least one pulsed laser beam. Such a system is described in patent application Ser. No. 12/435,547 (Bunker et al), filed May 5, 2009, which is incorporated herein by reference. Usually (though not always), the pulsed laser beam includes a pulse duration including a range less than about 50 μs, an energy per pulse having a range less than about 0.1 Joule, and a repetition rate with a range greater than about 1000 Hz. The system can also include a variety of other elements, such as a control subsystem coupled to the laser source, configured to synchronize the position of the substrate with the pulse duration and energy level. Such a control subsystem is advantageous when forming the passage holes and exit hole geometries through coatings applied over the substrate.

Figure 14:
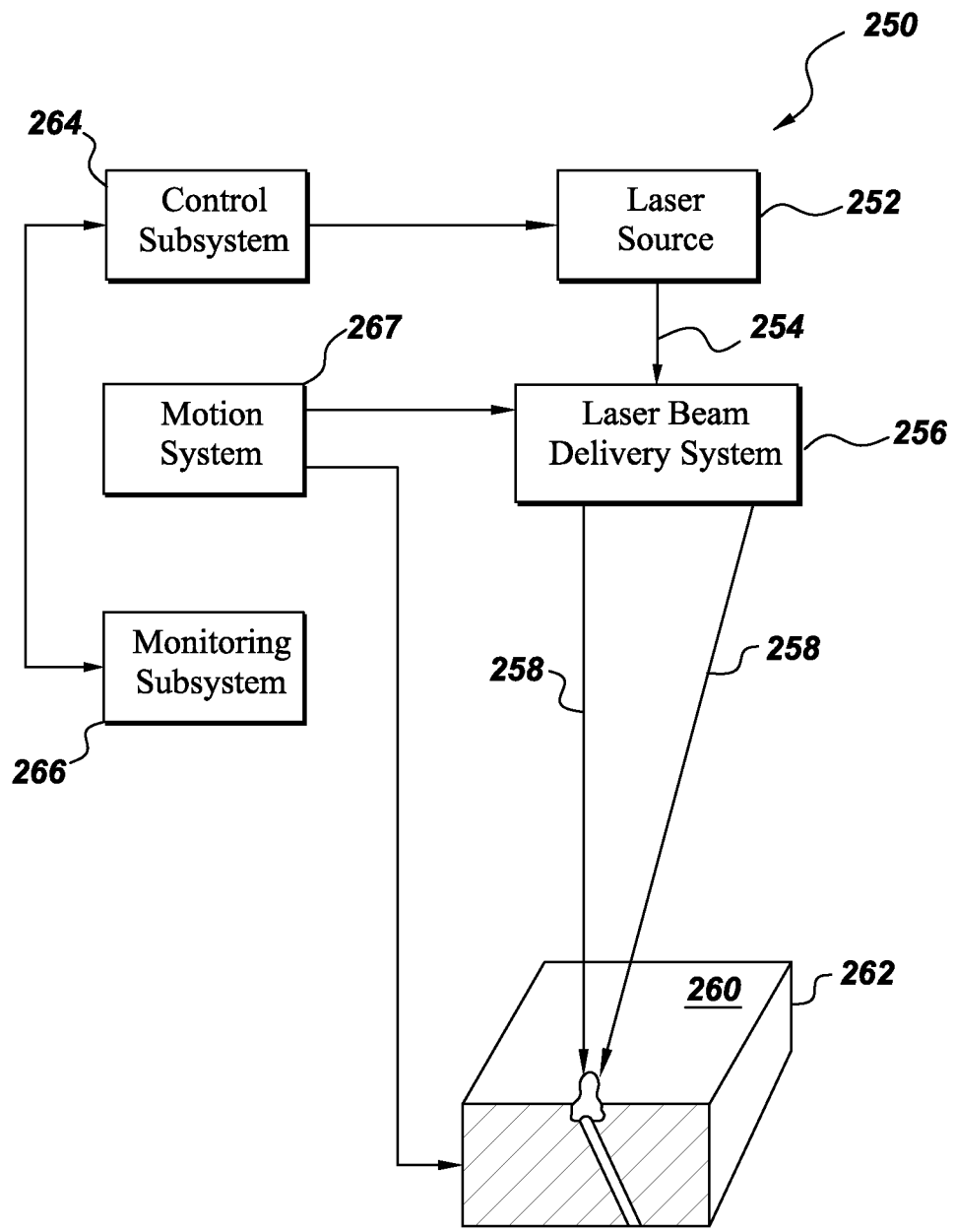
FIG. 14 is a schematic illustration of a laser-based system for producing passage holes according to embodiments of this invention.

FIG. 14 is a schematic illustration of a laser-based system for producing at least one passage hole according to embodiments of this invention. The system 250 includes a laser source 252, outputting a pulsed laser beam 254. The laser source 252 usually has a pulse duration less than about 50 μs, with an energy-per-pulse value of less than about 0.1 Joule. The pulses are typically activated with a repetition rate greater than about 1000 Hz. In one embodiment, the wavelength of the laser beam 254 is in a range between about 200 nm to about 1100 nm. In another embodiment, the average power of the laser beam is larger than about 20 W, with a desirable beam quality to focus down to spot sizes less than about 200 microns.

In an exemplary embodiment, the pulse duration is between about 10 μs and about 200 ns. In another embodiment, the pulse duration is between about 50 μs and about 1 femto second. With such a laser, a wide range of laser intensity can be achieved. Moreover, any negative effects of laser machining are mitigated, due to lower pulse energy, suitable wavelength, and shorter pulse duration. At the same time, relatively high material removal rates can be achieved, With continuing reference to FIG. 14, the laser beam delivery system 256, coupled to the laser source 252, transmits one or more beams 258 on a surface 260 of a sample 262. (The sample is illustrated in simple block form, but could be in the shape of a turbine blade, as described previously). In some embodiments, the laser beam delivery system 256 employs a mirror-lens-machining head based beam delivery. In other embodiments, a fiber-machining head based beam delivery may be employed. In some cases, the laser beam delivery system may employ an optical galvanometer scanner based beam delivery.

A motion system 262 is further coupled to the laser beam delivery system 256, to synchronize the relative location between laser beam firing and the sample 262. A monitoring subsystem 264 detects the location of the laser path, and the progress of the laser machining. In a typical embodiment, the monitoring subsystem 264 also collects the laser operation-information, and communicates back and forth with a control subsystem or a processor 266. The subsystem/processor can automatically stop the laser machining, and direct movement to a next machining location, when desired. In a typical system design, the control subsystem 264 is in communication with the laser source 252, the laser beam delivery system 256, the monitoring subsystem 266, and the motion system 262. Other relevant details regarding this type of system are provided in patent application Ser. No. 12/435,547. As in the case of the water jet system and the EDM apparatus, a laser-based system as described herein can be employed to precisely form the passage hole and exit geometry required for this invention.

Several additional variations and considerations should be noted. The processes described herein can be used to form an entire passage hole, i.e., including the preferred chevron outlet. However, they can also be used to form only the chevron outlet, e.g., as an extension of a passage hole (inlet bore) that has previously been formed within a substrate.

Moreover, a combination of the techniques described previously can be used to form the passage holes, or portions thereof. For example, the main portion of the passage hole, i.e., the inlet bore, could be formed by a laser drilling technique, and then the desired chevron outlet could be formed by an EDM or water jet technique. Other variations may also be possible. Several examples of combining different hole-forming techniques are provided in U.S. Pat. No. 4,808,785 (Vertz et al; incorporated herein by reference), although that teaching is not related to the particular chevron outlets required for the present invention.

EXAMPLE

The examples presented below are intended to be merely illustrative, and should not be construed to be any sort of limitation on the scope of the claimed invention.

Modeling studies were carried out on film cooling effectiveness, as a function of the (X/Ms) value, for a number of different, modeled shapes. (The non-dimensional distance "X/Ms" is the ratio of the axial distance "x" along the cooled surface, starting at the film hole exit, to the product of M*s, where "M" is the blowing ratio, and "s" is the equivalent two-dimensional slot height representing the same flow area as the film hole bore cross-section). In one instance, a standard diffuser-type passage hole was evaluated, i.e., a passage hole with no chevron characteristics at the hole exit, instead terminating in a standard, trapezoidal shape. Chevron-shaped holes which generally conform to the chevron geometry specified in U.S. Pat. No. 7,328,580 (Lee et al, discussed previously) were also evaluated, along with a chevron-based geometry formed by the multi-plunge technique described herein. The studies showed that the all of the chevron-shaped holes, including those formed by the multiplunge technique, exhibited a desirable level of cooling effectiveness.

Various embodiments of this invention have been described in rather full detail. However, it should be understood that such detail need not be strictly adhered to, and that various changes and modifications may suggest themselves to one skilled in the art, all falling within the scope of the invention as defined by the appended claims.

What is claimed:

1. An article in the form of a substrate, comprising:
   an inner surface, including an inlet;
   an outer surface spaced from said inner surface; and
   at least one row or other pattern of passage holes, wherein each passage hole includes an inlet bore extending through the substrate from the inlet at the inner surface to a passage hole-exit proximate to the outer surface, with the inlet bore terminating in a chevron outlet adjacent the hole-exit, said chevron outlet comprising:
      a pair of wing troughs extending from the hole exit to a terminus farthest from the hole exit and having one of a substantially elliptical, circular or partially circular cross-sectional shape defining a depth;
      a common surface region between the pair of wing troughs, wherein the common surface region comprises a valley adjacent the hole-exit; and
      a plateau adjacent the valley, the plateau including a top surface and at least one front face, wherein the valley extends from the hole exit to the at least one front face of the plateau and below a level of the top surface of the plateau and higher than the depth of the wing troughs and wherein the front face of the plateau is configured to extend only between the pair of wing troughs.

2. The article of claim 1, wherein:
   each passage hole is inclined between the inner and the outer surface;
   the wing troughs diverge longitudinally between the passage hole and the outer surface, and laterally along the common surface region; and
   the shape and size of the plateau and its surrounding common surface region maximizes diffusion of cooling air channeled through the passage holes from the inner surface to the outer surface, with minimal flow separation of the cooling air from the outer surface.

3. The article of claim 2, wherein the inlet bore terminates below the outer surface; and the troughs decrease in depth along the common surface region in a direction away from the inner surface, to blend with the outer surface.

4. The article of claim 1, wherein each wing trough has a total length-dimension.

5. The article of claim 1, wherein the plateau is generally in the shape of a triangle or a trapezoid.

6. The article of claim 1, wherein the plateau is generally in the shape of a triangle; and a vertex of the triangle-shaped plateau lies generally in a mid-point area between the two troughs, and above a portion of the common surface region, said vertex generally pointing toward the hole exit.

7. The article of claim 1, wherein the height of the plateau has a dimension which is about 2% to about 20% of the length-dimension extending from the passage hole-exit to a terminus farthest away from the hole-exit.

8. The article of claim 1, wherein the passage holes are substantially cylindrical.

9. The article of claim 1, wherein at least one coating is disposed on the outer surface; and at least a portion of each passage hole is formed through the coating.

10. The article of claim 9, wherein the coating comprises a ceramic material.

11. The article of claim 10, wherein the ceramic material is a thermal barrier (TBC) coating.

12. The article of claim 9, wherein the coating is a coating system comprising a ceramic TBC over a metallic coating; and the passage hole is formed through the coating system.

13. The article of claim 12, wherein the chevron outlet is formed partially within the coating system and partially within the substrate below the coating system.

14. The article of claim 1, wherein the substrate is a gas turbine engine wall.

15. The article of claim 1, wherein each passage hole is formed by a technique selected from the group consisting of a water jet cutting process; an electro-discharge machining (EDM) process, a laser-drilling process, and combinations thereof.

16. The article of claim 15, wherein each technique is carried out by directing a contacting device or a contacting medium to a pre-selected region of the substrate, wherein the device or medium is directed to the region in a single or repeated plunging motion, sweeping motion, or combination of plunging motions and sweeping motions.

17. A film-cooled airfoil or airfoil region configured with one or more chevron film cooling holes, wherein the airfoil or airfoil region comprises:
   at least one inner surface exposed to a first fluid and including an inlet;
   an outer surface spaced from the said inner surface, and exposed to a hotter second fluid;
   at least one row or other pattern of passage holes, wherein each passage hole includes an inlet bore extending partially through the substrate from the inner surface to a passage hole-exit proximate to the outer surface, with the inlet bore terminating in a chevron outlet adjacent the hole-exit, said chevron outlet comprising:

a pair of wing troughs extending from the hole exit to a terminus farthest from the hole exit and having a substantially elliptical cross-sectional shape defining a depth;

a common surface region between the pair of wing troughs, wherein the common surface region comprises a valley adjacent the hole-exit; and a plateau adjacent the valley, the plateau including a top surface and at least one front face, wherein the valley extends from the hole exit to the at least one front face of the plateau and below a level of the top surface of the plateau and higher than the depth of the wing troughs and wherein the at least one front face of the plateau is configured to extend only between the pair of wing troughs.

18. The airfoil or airfoil region of claim 17, characterized by a structure which permits combustion gases to function as the second fluid; and film-cooling gasses to function as the first fluid, wherein the first fluid travels through the passage hole from the inner surface to the outer surface; and wherein the structure provides minimum separation of the first fluid from the outer surface of the airfoil, in a region generally adjacent the chevron outlet at the outer surface.

19. A method for the formation of a row or other pattern of passage holes in a substrate which includes an inner surface and an outer surface spaced from the inner surface, and further comprises an inlet bore extending at least partially between the two surfaces, said inlet bore terminating in a chevron outlet adjacent a hole-exit proximate to the outer surface, wherein the chevron outlet comprises;

a pair of wing troughs extending from the hole exit to a terminus farthest from the hole exit and having a substantially elliptical cross-sectional shape defining a depth;

a common surface region between the pair of wing troughs, said common surface region comprising a valley adjacent the hole-exit, and a plateau adjacent the valley, the plateau including a top surface and at least one front face, wherein the valley extends from the hole exit to the at least one front face the plateau and below a level of the top surface of the plateau and higher than the depth of the wing troughs and wherein the front face of the plateau is configured to extend only between the pair of wing troughs, and wherein said method comprises forming each inlet bore and chevron outlet by directing a contacting device or a contacting medium to a pre-selected region of the substrate, in a computer-controlled single- or repeated plunging motion, sweeping motion, or combined plunging-and-sweeping motion.

20. The method of claim 19, wherein the contacting device comprises a wire electrode which is operatively connected to and guided by an electro-discharge machining (EDM) device.

21. The method of claim 19, wherein the contacting medium comprises water from a water jet cutting device.

22. The method of claim 19, wherein the contacting medium comprises a laser beam from a laser drilling apparatus.

* * * * *